United States Patent [19]

Van Santen et al.

[11] 3,904,048
[45] Sept. 9, 1975

[54] DEVICE FOR REFUELING A NUCLEAR REACTOR HAVING A CORE COMPRISING A PLURALITY OF FUEL ASSEMBLIES

[75] Inventors: Aart Van Santen, Vasteras; Kjell Elofsson, Handen, both of Sweden

[73] Assignee: Allmanna Svenska Elektriska Aktiebolaget, Vasteras, Sweden

[22] Filed: Sept. 20, 1971

[21] Appl. No.: 182,171

Related U.S. Application Data

[62] Division of Ser. No. 881,111, Dec. 1, 1969, Pat. No. 3,733,250.

[30] Foreign Application Priority Data

Dec. 2, 1968 Sweden.............................. 16408/68

[52] U.S. Cl.................................... 214/27; 176/30
[51] Int. Cl.............................................. G21c 19/20
[58] Field of Search ............... 214/18 N, 27; 176/30; 294/86 A, 87 R

[56] References Cited
UNITED STATES PATENTS

| | | | |
|---|---|---|---|
| 2,863,579 | 12/1958 | Meyer.............................. | 294/87 R |
| 3,138,535 | 6/1964 | Fortescue et al. ............ | 214/18 N X |

Primary Examiner—Robert G. Sheridan

[57] ABSTRACT

A nuclear reactor formed of fuel assemblies each including a plurality of parallel fuel rods arranged in a predetermined fuel rod lattice, which rods are freely extractable and insertable at one end of the fuel assembly, is refueled by extracting from one of the fuel assemblies a number of fuel rods substantially less than the total number of fuel rods and replacing these by inserting new fuel rods into the vacated positions. This is done for a majority of fuel assemblies of the reactor. At the next refueling operation different fuel rods from those previously replaced are removed and replaced. The removal and return of the rods is produced by a tool having a plurality of gripping members capable of engaging shoulders beneath heads formed on the upper ends of the fuel rods. This may be accomplished by providing a tool having a number of gripping members attached to the tool body corresponding to the lattice positions of the fuel rods to be extracted, having gripping members which can be pushed together to grip beneath shoulders on the upper ends of the fuel rods.

14 Claims, 14 Drawing Figures

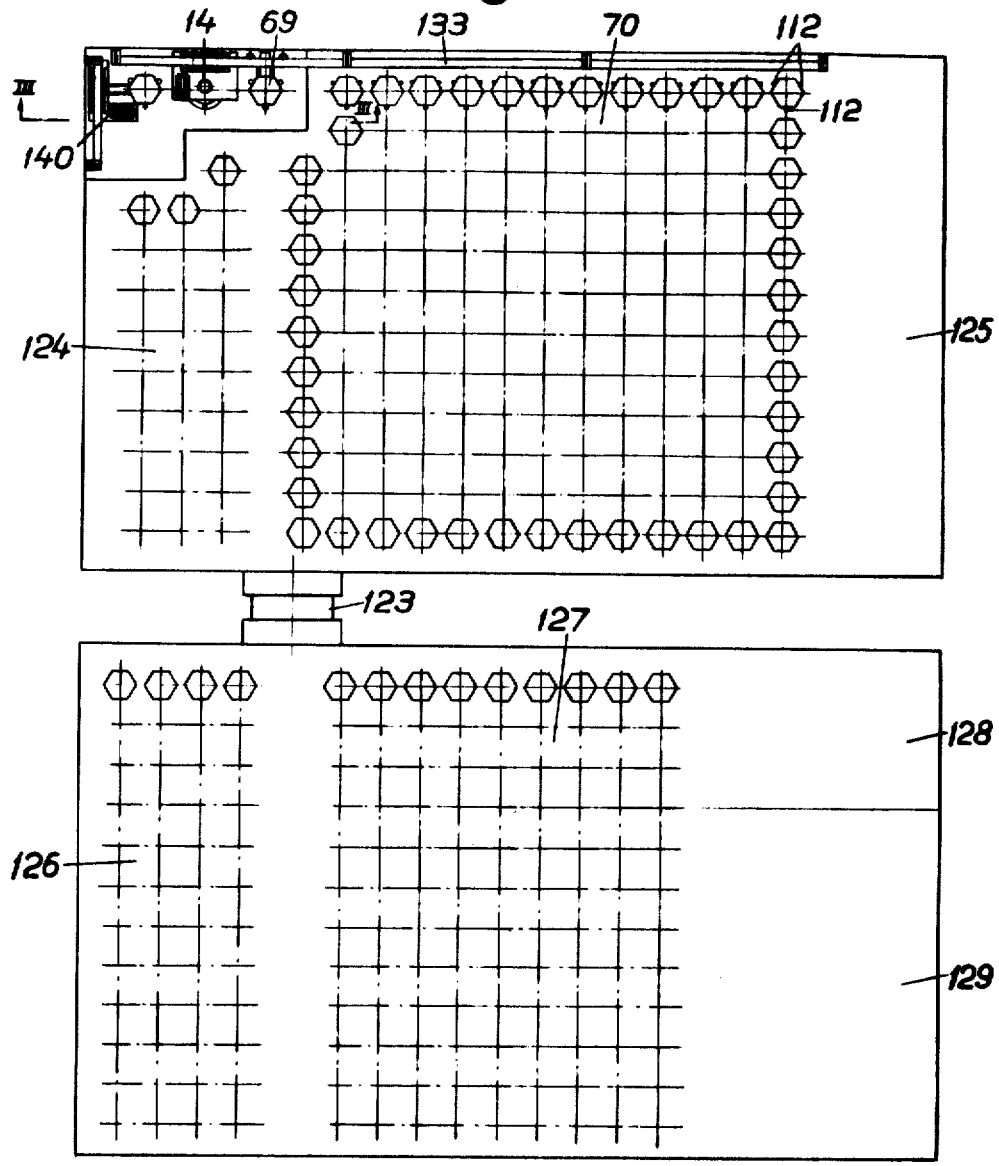

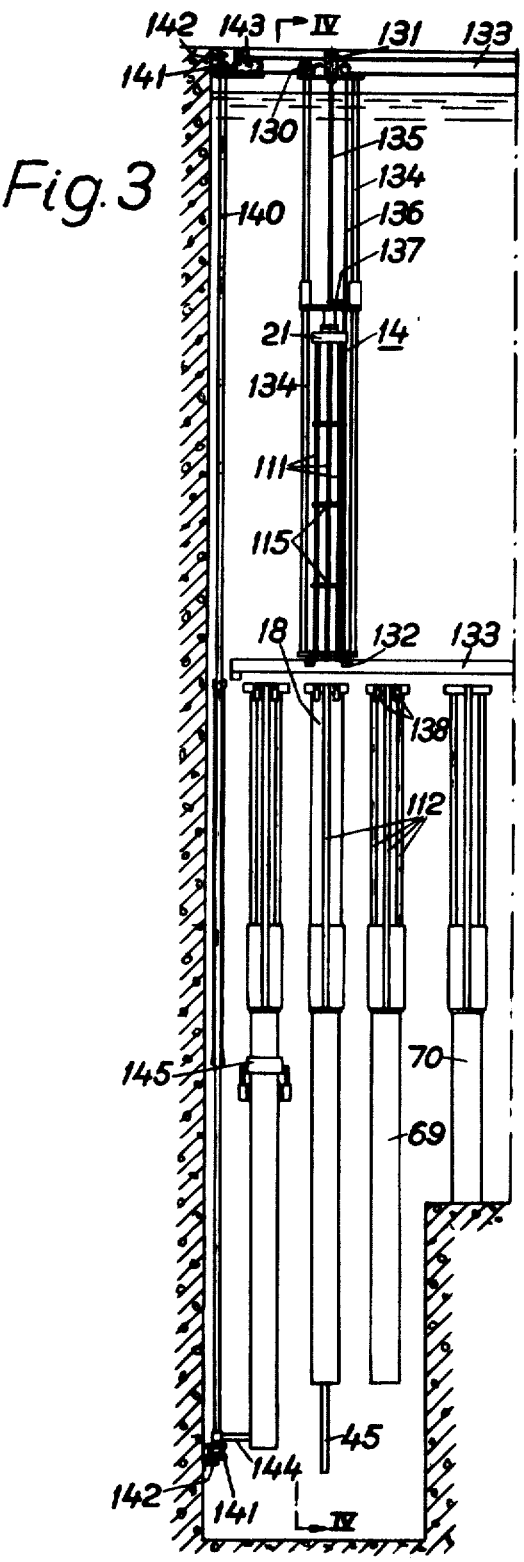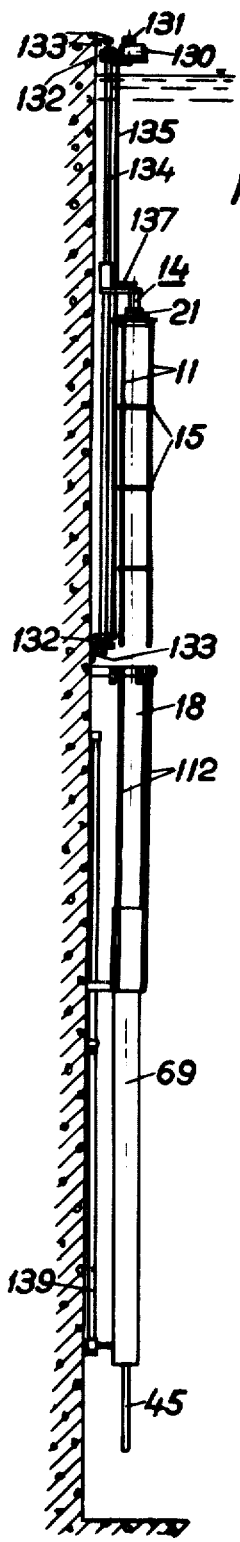

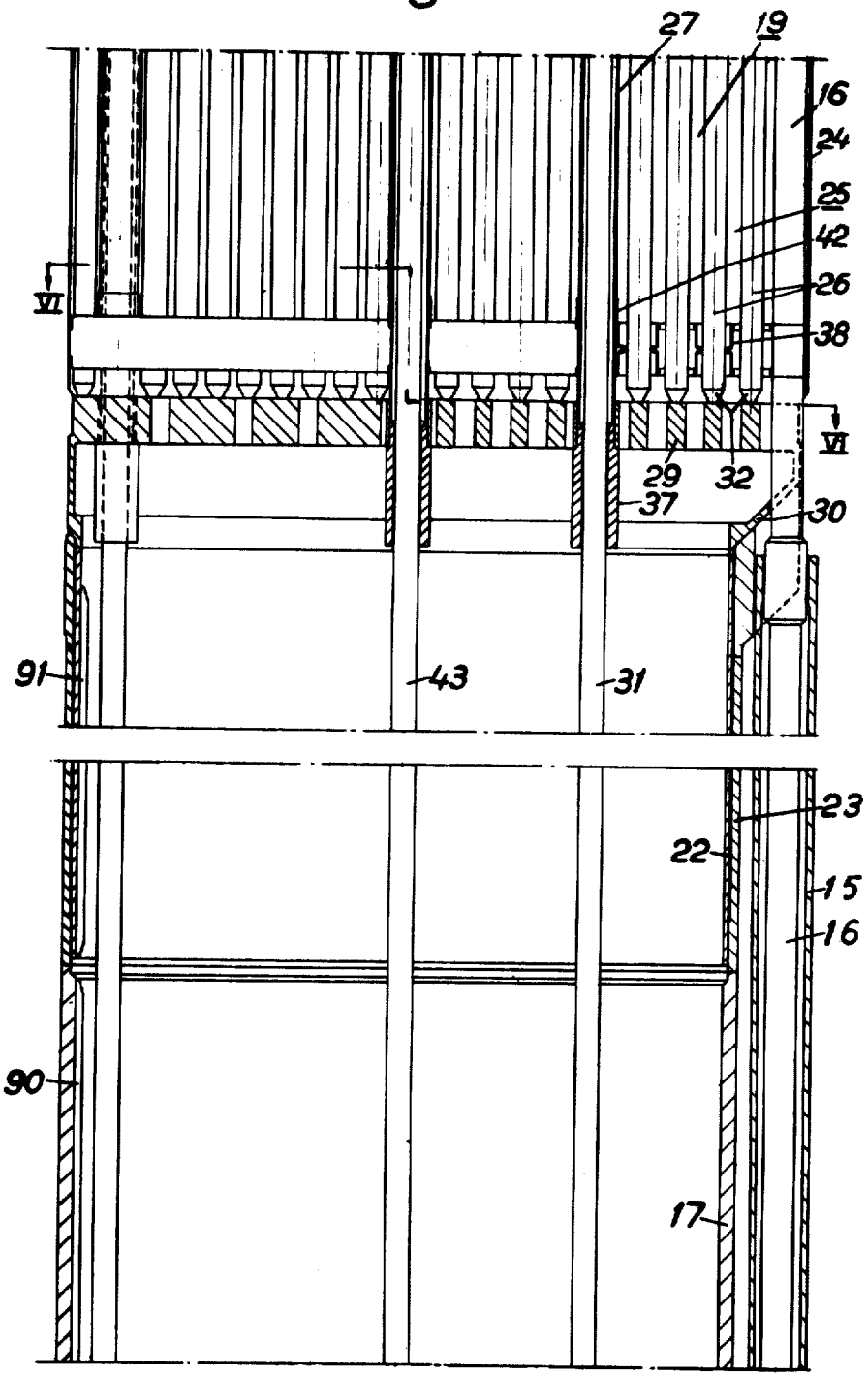

DEVICE FOR REFUELING A NUCLEAR REACTOR HAVING A CORE COMPRISING A PLURALITY OF FUEL ASSEMBLIES

This is a division of application Ser. No. 881,111, filed Dec. 1, 1969, now Pat. No. 3,733,250.

BACKGROUND OF THE INVENTION

1. Field of Invention

The invention relates to a method of refueling nuclear reactors and the apparatus for use in such method.

2. The Prior Art

When the burn-up in a nuclear reactor has reached the point at which a minimum acceptable excess reactivity is arrived at, a refuelling operation is carried out. It is known to exchange all the fuel in the reactor core, for instance in certain nuclear-powered submarines. It is also known to partially exchange the fuel in the core, by replacing, for instance, one fifth of the number of fuel assemblies, uniformly distributed over the core by fuel assemblies containing only fresh unirradiated fuel. By an appropriate calculation of how much fuel is to be replaced and the enrichment of the new fuel, a reactivity jump is obtained which permits a certain amount of energy to be used before the next refueling operation. With a certain initial enrichment more energy is obtained from the fuel by a partial refuelling than by refuelling the whole core. The reactivity increase following a partial refuelling shows local variations and these variations increase rapidly with the size of the fuel assembly, this being one of the reasons that fuel assemblies now in use for boiling light water reactors have between 25 and 144 fuel rods. If a much larger irradiated fuel assembly were replaced by a new one, the mismatch factor would be too high, resulting in reactivity that the core in a nuclear reactor should be built up of a plurality of fuel assemblies, each of which comprises a multitude of parallel fuel rods arranged in a predetermined lattice, the fuel rods being freely extractable and insertable at one end of the fuel assembly.

SUMMARY OF THE INVENTION

The present invention relates to a method and means for refuelling such a nuclear reactor. The method comprising the steps of extracting from one of the fuel assemblies an arbitrary number of fuel rods supported axially by a base and arranged in arbitrary fuel rod positions in the fuel rod lattice, replacing the extracted fuel rods by inserting new fuel rods into the fuel rod positions previously occupied by the extracted fuel rods, thereby refuelling the fuel assembly partially, and repeating the steps on at least a majority of the fuel assemblies, thereby refuelling the reactor at least partially. This system of partial fuel exchange within a fuel assembly, on comparison with conventional refuelling, gives the advantages of lower mismatch factor, improved burn-up and more gradual lowering of the reactivity during the burn-up process, and also enables a lower enrichment to be used at the start. Furthermore, if an accident should occur after a short time with a single fuel rod, this can be exchanged and the assembly used again. However, in conventional constructions the entire fuel assembly must be discarded.

Preferably those fuel rod positions in which a partial fuel exchange is to be performed upon a given occasion from a predetermined pattern. The pattern, which may be lattice-like and substantially regular, can with advantage be varied in such a way that after a certain number of partial refuelling operations substantially all the fuel rods in the fuel assembly have been exchanged once. Preferably the same pattern is used for all the fuel assemblies on a given refuelling occasion.

It is advantageous to replace in each fuel assembly a substantially constant number of fuel rods on every given refuelling occasion and for these fuel rods to be substantially evenly distributed over the cross-section of the fuel assembly.

It is advantageous to extract simultaneously all the rods to be replaced when partially refuelling the fuel assembly and then to insert simultaneously the new fuel rods replacing the extracted ones.

The extraction as well as the insertion of the fuel rods is preferably carried out by means of one single tool.

The device for refuelling a nuclear reactor having a core comprising a plurality of fuel assemblies, each of which comprises a multitude of parallel fuel rods arranged in a predetermined lattice, all the fuel rods being freely extractable and insertable at one end of the fuel assembly, comprises a tool for extracting and inserting a number of the freely extractable and insertable fuel rods, said tool comprising a tool body, a number of gripping members attached to the tool body in positions corresponding to the lattice positions of the fuel rods to be extracted, and means for urging the gripping members to grip and to release the fuel rods. Such a device enables the use of fuel assemblies which are considerably larger than those at present in use and has the same advantages as the method described above.

According to a preferred embodiment the tool body comprises a transverse carrier member axially movable with respect to the fuel rods having a multitude of connection points for the gripping members, the connection points being arranged in a predetermined lattice identical to the fuel rod lattice, and guide means attached to the transverse carrier member for guiding the gripping members at least substantially coaxially with the respective fuel rods, the tool having a multitude of said gripping members, of which a number corresponding to the number of fuel rods to be extracted at a given occasion are removably attached to the transverse carrier member at the connection points, each gripping member comprising at least two cooperating gripping jaw members movable into and out of engagement with a shoulder arranged at an end of the corresponding fuel rod, the shoulder facing the fuel rod at least partially, the grip and release urging means comprising means for moving the gripping jaw members into engagement with the shoulder means for moving the gripping jaws members out of engagement with the shoulder, whereby the tool can extract and insert an arbitrary number of fuel rods arranged in arbitrary fuel rod positions in the fuel rod lattice of the assembly.

It is preferably for the guide means to comprise a plurality of guide rods rigidly attached to the transverse carrier member, each guide rod sliding in a tube parallel with the fuel rods guided by the inner surface of the tube during a fuel rod manipulation operation. Advantageously some of the guide rods are arranged to slide in guide tubes for absorber fingers of a fingertype control rod, the absorber finger guide tubes being placed on fuel rod positions in the fuel rod lattice. lattice. The transverse carrier member preferably comprises a transverse carrier plate and a tubular, axial shaft having a transverse flange, attached to the transverse carrier plate at at least three of the lattice positions corresponding to guide tubes for the absorber fingers, and it is advantageous if the connection points are in the form of apertures in the carrier plate.

Preferably each gripping member comprises a coupling part for detachable coupling to the transverse carrier member, a pivot in the coupling part located in a plane perpendicular to the fuel rods, and two gripping arms, each arm suspended at one end on the pivot and having at the other end a gripping jaw. The gripping arms are preferably identical, have together a substantially circular cross-section, have a narrow part and a wide part and a truncated conical transition part between said parts, the means for moving the grip ping jaw members out of engagement comprising a spring element arranged to part the gripping jaws, the means for moving the gripping jaw members into engagement comprising an axially displaceable transverse locking member having an axial aperture in each lattice position, the apertures located in the fuel rod positions co-operating with the gripping arms so that an axial displacement of the locking member from the narrow part of the gripping arms to the wide part moves together the gripping jaws against the spring force exerted by the spring elements. The transverse locking member preferably comprises a transverse locking plate, an operating rod projecting centrally and axially from the locking plate and through the transverse carrier member, and stops limiting the axial movement of the locking plate with respect to the gripping members, the locking member further comprising a plurality of axial guide rods attached to the locking plate in absorber finger guide tube positions, the guide rods being slidingly guided by the walls of apertures arranged in the transverse carrier member.

The tool preferably further comprises at least one axially movable member for preventing the fuel rods from buckling when being inserted into their respective positions in the fuel rod lattice. The buckling-preventing member may comprise an axially movable transverse plate having an axial aperture for each fuel rod, the plate being guided by the guide rods projecting from the transverse carrier member and sliding in the absorber finger guide tubes. The buckling-preventing plate may be arranged during the first part of an insertion operation to rest on the radially projecting stops and during the last part of the insertion operation to rest at least indirectly against the fuel assembly. Alternatively the buckling-preventing member may further comprise at least three suspension guide rods attached to the buckling-preventing plate in lattice positions corresponding to those of the absorber finger guide tubes, the suspension guide rods extending axially through and being slidingly guided by apertures in the transverse carrier member and having free ends with radially projecting stops, the buckling-preventing plate during the first part of an insertion operation resting suspended from the transverse carrier member by the suspension guide rods and their stops, and the plate during the last part of an insertion operation resting at least indirectly against the fuel assembly.

In those cases when the tool includes a buckling-preventing member, it is advisable for it also to include means for supporting the buckling-preventing plate axially, at least during the first part of the insertion operation, at such a distance along the fuel rods to be inserted into the assembly, that minimum buckling lengths are obtained on both sides of the buckling-preventing plate. An axially movable support frame preferably surrounds the buckling-preventing member radially, at least during the first part of the insertion operation, and axial guide rods are attached to the transverse carrier member and arranged outside the fuel assembly for guiding the movable support frame.

BRIEF DESCRIPTION OF THE DRAWINGS

In the following the invention will be further described with reference to the accompanying drawings.

FIG. 2 shows schematically a view of a refuelling pool seen from above.

FIG. 3 shows a corner of the refuelling pool, partly in vertical section along the line III—III in FIG. 2.

FIG. 4 shows the same corner of the refuelling pool, partly in vertical section along the line IV—IV in FIG. 3.

FIGS. 5a – d show, partly in longitudinal section, a view through a core unit consisting of a fuel assembly and a fingertype control rod, resting in a control rod guide tube.

DESCRIPTION OF THE PREFERRED EMBODIMENTS

Figure 1:
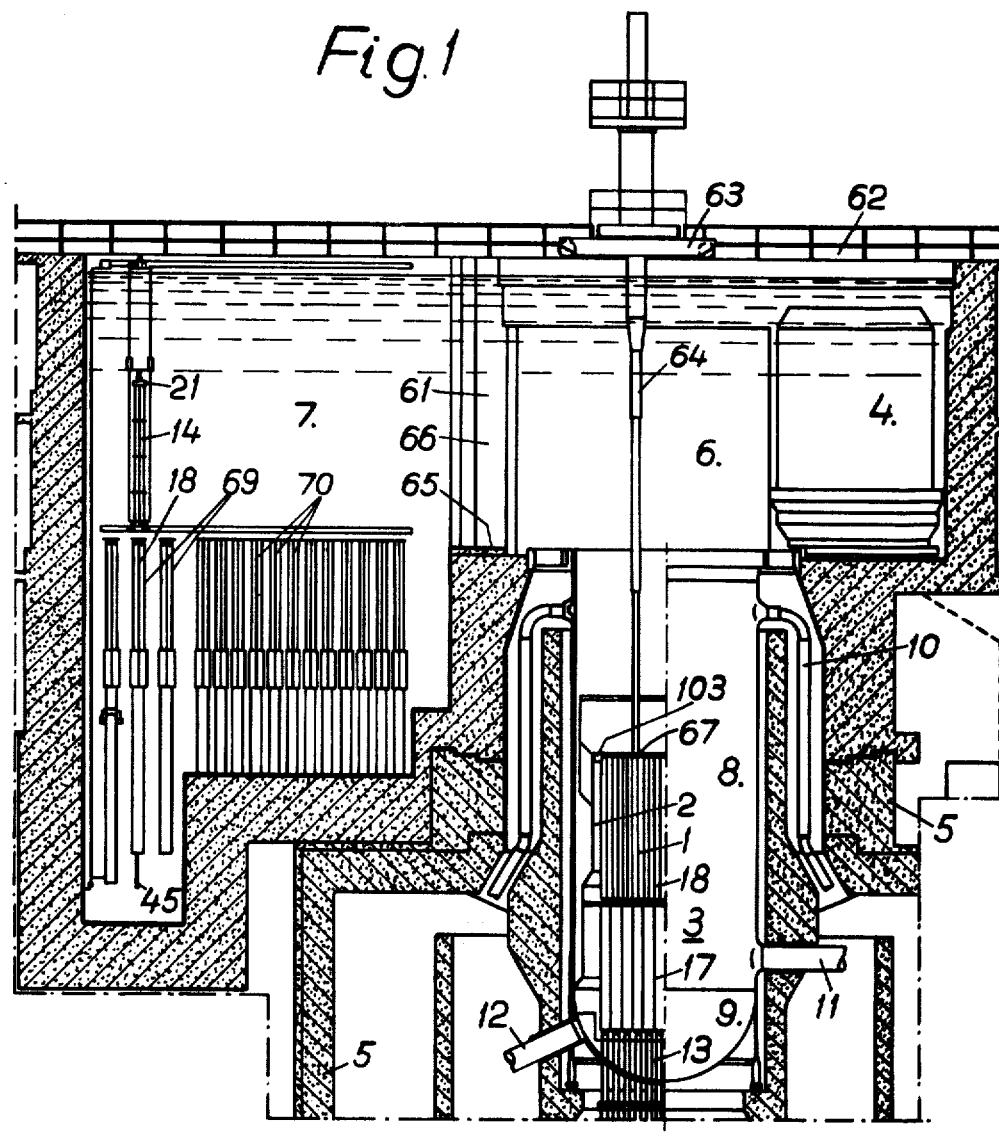
FIG. 1 shows partly in vertical section a boiling light water reactor during refuelling, a refuelling pool and equipment for refuelling.

The reactor 3 shown schematically in FIG. 1 is a boiling light water reactor with forced circulation and internal steam-separation. The reactor 3 is surrounded by a primary containment vessel 5 of concrete. The containment vessel 5 is a part of the building construction which also comprises a shaft 6 arranged above the reactor 3, and a fuel pool 7, normally separated from the shaft by gates located at 61.

The core 1 of the reactor 3 is surrounded by a moderator tank 2, to which a core superstructure having steam separators and dryers is usually attached. The core superstructure is preferably constructed in the manner described in U.S. patent application Ser. No. 704,938 to B. Sodergard, entitled: Attachment means for the superstructure above the core in a light water boiling reactor, filed on Feb. 12, 1968 and assigned to the present assignee, now Pat. No. 3,625,819. The moderator tank 2 is in turn surrounded by a reactor pressure vessel 8 with a bottom part. A plurality of steam-pipes 10 lead from the upper part of the reactor pressure vessel 8. Between the moderator tank 2 and the reactor pressure vessel 8 is a gap from which circulating water is taken out through a plurality of connections 11 to circulation pumps, not shown, from where the water is returned through a plurality of connections 12. If desired, circulation pumps inside the reactor may be used, in this case preferably being arranged in the manner described in U.S. patent application Ser. No. 857,686 to Lars Leine et al., entitled: Nuclear reactor having internal pumps, filed on Sept. 15, 1969, and assigned to the present assignee, now Pat. No. 3,723,247. A multitude of parallel vertical tubes pass through the bottom part 9. These tubes comprise leading-in tubes 13 for drives for control rods and leading-in tubes, not shown, for neutron flux measuring probes, similarly not shown. The upper ends of the leading-in tubes or the guide tubes 13 for the control rod drives are situated at the same level and carry control rod guide tubes 17 of equal lengths. Each control rod drive comprises an electric motor, a screw and a nut for normal operation of the appropriate control rod, and is provided with a scram function. Preferably a drive in accordance with that described in Swedish patent No. 314,749 is used.

The core 1 is built up of vertical core units 18, equivalent in number to the number of control rod guide tubes 17. As is shown more clearly in FIGS. 5a – d and 6, each core unit 18 comprises a fuel assembly 19 with substantially hexagonal cross-section and a fingertype control rod mechanism 20 arranged to operate inside the assembly 19 by insertion upwards and withdrawal downwards. The fuel assemblies 19 are arranged close together with only a small gap between each other.

After shutdown for fuel exchange, the reactor 3 is cooled down, for example to below 60°C and the pressure drops to atmospheric pressure. Opening of the reactor is started by lifting away radiation shielding blocks in the shaft 6 above the reactor 3 and a semispherical lid forming the upper part of the containment vessel 5 is released and moved, as well as the radiation shielding blocks, to specially prepared positions in the reactor hall.

The lid of the reactor pressure vessel 8 has only one pipe-connection, that is for the supply of coolant to the lid of the pressure vessel during emergency cooling. This pipe is removed and the bushings in a permanent seal between the flange of the reactor pressure vessel 8 and the containment vessel 5 are sealed.

After a bolt-joint between the reactor vessel 8 and its lid has been loosened, the lid can be lifted by a reactor hall traverse and placed behind the radiation shielding blocks lifted earlier.

The shaft 6 above the reactor pressure vessel 8 is filled with water and the gates (at 61) to the fuel pool 7 are opened. The core super structure 4 is detached from the moderator tank 2 and moved under water to a position in the water-filled space opposite the fuel basin 7.

The removal and insertion of fuel can then be started. The operations are controlled manually from an operating platform comprising traverse bridge 62 and trolley 63, which can be moved to the desired positions above the reactor core 1 and the fuel pool 7.

On the trolley 63 is a telescope-cylinder means 64 with hoisting machinery. The telescope-cylinder means 64, which can be turnable is provided at its lower end with a manipulating tool 67 for manipulating the core units 18. The tool, which is described in more detail in the copening U.S. patent application Ser. No. 881,112 to Aart van Santen et al., entitled: Method and manipulating tool for moving a nuclear reactor core unit, filed simultaneously herewith and assigned to the present assignee, now abandoned, can be operated pneumatically and be provided with a safety lock to prevent unintentional opening during transport. The hoisting machinery is preferably equipped with a load-sensing means which interrupts the lifting process if the lifting force tends to be too great if a core unit has stuck. Similarly, the lowering process is interrupted if unloading takes place too early if a core unit does not go down as it should.

So that the personnel shall not be unintentionally subjected to too high radiation doses, the lifting process is interrupted automatically if the operator lifts a core unit too high in the water pool.

All functions are controlled from an operating stand on the trolley 63 and the operator can visually supervise the movement of the manipulating tool both through observation apertures in the floor and by means of television equipment.

The core units 18 are lifted from the reactor 3 to such a height that they pass freely over the threshold 65 into the transport channel 66 to the fuel pool 7, which is lined with stainless steel. The trolley 63 is then moved to this space with the core unit 18 hanging in the water underneath. The layer of water above the top of the core unit 18 must be more than 3 meters in order to give sufficient protection from radiation. The core unit 18 is lowered to one of a number, for example three, fuel exchange positions 69, in the shown embodiment situated in one corner of the fuel pool 7, and is locked there. The absorber fingers of the fingertype control rod 20 are drawn out to a normal lower position. An exchange machine 14 for fuel rods 26 moves forward and grips the rods to be replaced with its tool 21. When refuelling takes place once a year usually about one fourth or one fifth of the number of fuel rods are exchanged each time so that all the fuel has been exchanged after 4 or 5 years. The machine 14 now extracts the fuel rods and transports them to a deposit position 70. From another position next to it the tool 21 picks up a set of new fuel rods and inserts them in the fuel assembly 19. When the control rod mechanism 20 has been pushed up to its top position, the locking of the core unit 18 is released, after which the manipulating tool 67 grips the core unit 18 and the trolley 63 transports it back to the reactor 3.

In order to make it easier to understand the intended function of the tool 21, the core unit 18 is first described, this comprising a fuel assembly 19 and a fingertype control rod mechanism 20, as mentioned above. As seen more clearly in FIG. 5b, each fuel assembly 19 is provided with an elongated lower end part 22 projecting axially downwards which, when the fuel assembly 19 has been lowered to the intended position in the core 1, cooperates with an upper end part 23 arranged at the upper end of each control rod guide tube 17 in such a way that the fuel assemblies 19 only rest upright in the control rod guide tubes 17 and are supported laterally only by these control rod guide tubes 17 and, at least when the reactor is in operation, by each other, except for the fuel assemblies 19 adjacent to the moderator tank 2 which, at least when the reactor is in operation, are supported at least indirectly by the moderator tank 2. Thus in this construction of the reactor, there is no core grid arranged to guide the upper ends of the fuel assemblies, which means that the gaps between the fuel assemblies can have a minimum width.

As is known, slim construction elements such as fuel assemblies are never completely straight, but always deviate slightly from complete straightness due to manufacturing problems. The already negligible gap between the fuel assemblies 19 will therefore be reduced at some points so that, at least when the reactor is in operation, the fuel assemblies 19 will abut and support each other. The moderator tank 2 has preferably, but not necessarily, a circular cross-section so that it can take up pressure differences between the inside and the gap with minimal deformation. So that the outer fuel assemblies 19 in the core 1, at least when the reactor is in operation, can obtain support from the inner wall of the circular moderator tank 2, this is provided with at least one support member projecting in against the fuel assemblies 19, for example in the form of a ring 103, the inner edge of which supplements the cross-sectional contour of the core 1, or in the form of inwardly projecting plates running substantially axially or at an acute angle along the fuel assemblies 19. These forms of support member may also be combined. The width of the gap is suitably less than about 2 mm, preferably about 0.5 mm. A lower limit is set in practice by the deviation from complete straightness of the fuel assemblies, since the contact pressure between adjacent fuel assemblies during shut-down of the reactor should not be so great that there is a risk, when lifting one core unit, of dragging along an adjacent core unit at the same time.

The fuel assembly 19 consists of a shroud 24 having substantially hexagonal cross-section, a fuel rod bundle 25 with a plurality parallel vertical fuel rods 26 arranged in an equilateral triangular lattice, guide tubes 27 for absorber fingers 31 of the finger control rod mechanism 20, a plurality of spacers 28 arranged at different levels, a transverse perforated bottom plate 29, a transition part 30 for transition from hexagonal to circular cross-section and the above-mentioned elongated lower end part 22.

The shroud 24, which may also be omitted, may have a length of about 4 m and a wall-thickness of about 0.5 – 2 mm, preferably about 0.6 – 0.7 mm and consists of a zirconium alloy. Its upper end extends above the upper end of the fuel rod bundle 25 to facilitate the positioning of the lifting tool 67 when exchanging the core unit. The sides of the shroud 24 are corrugated and follow the contours of the fuel rods 26. This corrugation increases the resistance to bending in longitudinal direction of the shroud 24. The resistance to bending laterally is reduced and thus an over-pressure inside the fuel assembly 19 in comparison with the pressure in the surrounding gap deforms the shroud 24 elastically more easily than before so that the already negligible gap becomes almost non-existent. A pressure difference of some tenths of a bar is sufficient to "blow up" the shrouds to abut each other. Furthermore, the corrugation of one shroud side engages with the corrugation of an adjacent shroud side so that the fuel assemblies 19 partly lock each other and the mechanical stability of the core is increased. This is of particularly great value since, as mentioned, there is no core grid in this core design. The control rod guide tubes 17 have circular cross-section which fits well to the hexagonal cross-section of the shroud 24, thus enabling even distribution of the absorber fingers 31 over the cross-section of the assembly. Of course, shrouds having substantially square cross-section may also be used, in which case it is suitable for the control rod guide tubes 17 to have similar cross-section.

In the case shown the fuel assembly lattice comprises 331 possible fuel rod positions. Of these, 305 are taken up by fuel rods, 25 by absorber finger guide tubes and one by the neutron flux measuring probe 16. The fuel rods 26 consist of enriched uranium dioxide pellets having a diameter of about 10.5 mm, which are stacked in cladding tubes of a zirconium alloy and having a wall-thickness of about 0.8 mm. The cladding tubes are closed at the ends by lower and upper end plugs 32 and 33, respectively. The lower end plugs 32 taper towards the bottom in order to facilitate insertion of the fuel rods 26 through the spacers 28 and the upper end plugs 33 have a neck part 34 and a head part 35 with downwardly directed shoulder 36 which gives a grip for the exchange tool 21 to withdraw the fuel rod 26 from the fuel rod bundle. It is obvious that many other types of end plugs can offer a grip. For instance in the embodiment shown the shoulder 36 is flat, annular and downwardly directed, in another embodiment it is truncated cone-shaped and directed downwardly-outwardly, in yet another embodiment the head is spherical and the shoulder 36 comprises a spherical zone, in still another embodiment the head comprises a transverse cylindrical pin so that two shoulders 36 are obtained and in still another embodiment the end plug 33 comprises an upwardly axially projecting tubular collar having, for example, three internal circular grooves which thus offer three downwards or downwardly-inwardly directed shoulders. The fuel rods 26 are inserted through the spacers 28 to contact the upper side of the perforated bottom plate 29. The plate 29 has only a supporting function and therefore, as opposed to conventional end plates, is not provided with accurately positioned holes for the lower end plugs 32 of the fuel rods 26 since the positioning function has been assumed by the lowermost of the spacers 28. The absorber finger guide tubes 27 are attached to and extend upwardly from the perforated bottom plate 29, on the lower side of which are inlet throttling means coaxial with the guide tubes 27 in the form of stub tubes 37 having a smaller inner diameter than the guide tubes 27. These inlet throttling means provide such flow resistance that a substantially constant flow of coolant is obtained through the guide tubes 27 irrespective of how far the control rod 20 is withdrawn with respect to the fuel rod bundle 25.

Each spacer 23 is surrounded by a spacer frame and comprises a multitude of spacer elements 38, each of which surrounds a fuel rod 26. The spacer element 38 comprises two identical dodecagonal rings 39 surrounding the fuel rod, said rings being spaced from each other and connected to each other by four elongated, strip-shaped, vertical spacer springs 40 distributed evenly round the fuel rod ahd having varying strip width and proturberances 41 abutting said fuel rods 26. The spacer frame is trapezium shaped so that it follows three consecutive sides in each of the outer dodecagonal spacer elements 38 with the exception of the corner positions in which, in a hexagonal lattice, the spacer frame follows five consecutive sides and then continues to the next adjacent spacer element 38. It may be provided with holes, but in the embodiment in which the fuel assembly 19 has no shroud, it is advisable for it to be unperforted. It is then suitable for the spacer frame to be higher than the spacer elements 38 and for its upper and lower edges to be bent in towards the fuel rod bundle 25 so that the spacer frames of adjacent fuel assemblies do not hook into each other when a core unit is being lifted or lowerd. When there is no shroud it is also suitable for the upper edge of the uppermost spacer frame to extend up to a level above the upper end of the fuel rod bundle 25 in order to facilitate guiding of the manipulating tool, or for the spacer frame to be provided with special parts having a similar function. A high spacer frame also dampens any possible flow-induced oscillations of the fuel assemblies, assuming that the spacers of adjacent fuel assemblies are arranged at the same levels. If two spacer frames at the same level are moved together, the water in the gap between them must be forced away and if they are moved apart, the water must be sucked in. The damping effect increases with increased height of the spacer frame or increased area of plates or the like attached to the frame. Even if a few of the assemblies lack shrouds, it is advantageous to arrange adjacent fuel assemblies in such a way that the corrugation of one spacer frame engages in the corrugation of an adjacent spacer frame or shroud side.

The spacers 28 are attached to the guide tubes 27 for the absorber fingers. Since the guide tubes 27 are thin-walled, the wall thickness is about 0.5 mm, it being suitable for the spacers 28 to be attached with the help of a reinforcing tube 42. This may then comprise an upper and a lower half which may have different heights, or be provided with recesses to permit the spacer springs 40 in spacer elements 38 abutting the reinforcing tube 42 to spring out from the fuel rods 26. In order to achieve the desired resilient holding of the fuel rods 26 it is necessary when stacking the spacer elements 38 laterally to form a spacer to ensure that each spacer spring 40 can spring out from its fuel rod 26 without meeting any obstruction, for example a spacer spring in an adjacent spacer element 38, an absorber finger guide tube 27 or a reinforcing tube 42. A method of stacking the spacer elements 38 regularly, which is to be preferred from the inspection point of view, is shown in the lower lefthand part of FIG. 6.

The fingertype control rod mechanism 20 comprises twenty-five vertical, parallel fingers, 24 of which are abosrber fingers 31 and one of which is an axially somewhat movable central rod 43 which, of course may be an absorber finger, but preferably consists of stainless steel. The absorber fingers 31 are equal in length and are arranged substantially in two circles concentric with the central rod in such a way that there are nine in the inner circle and fifteen in the outer circle.

Figure 5A:
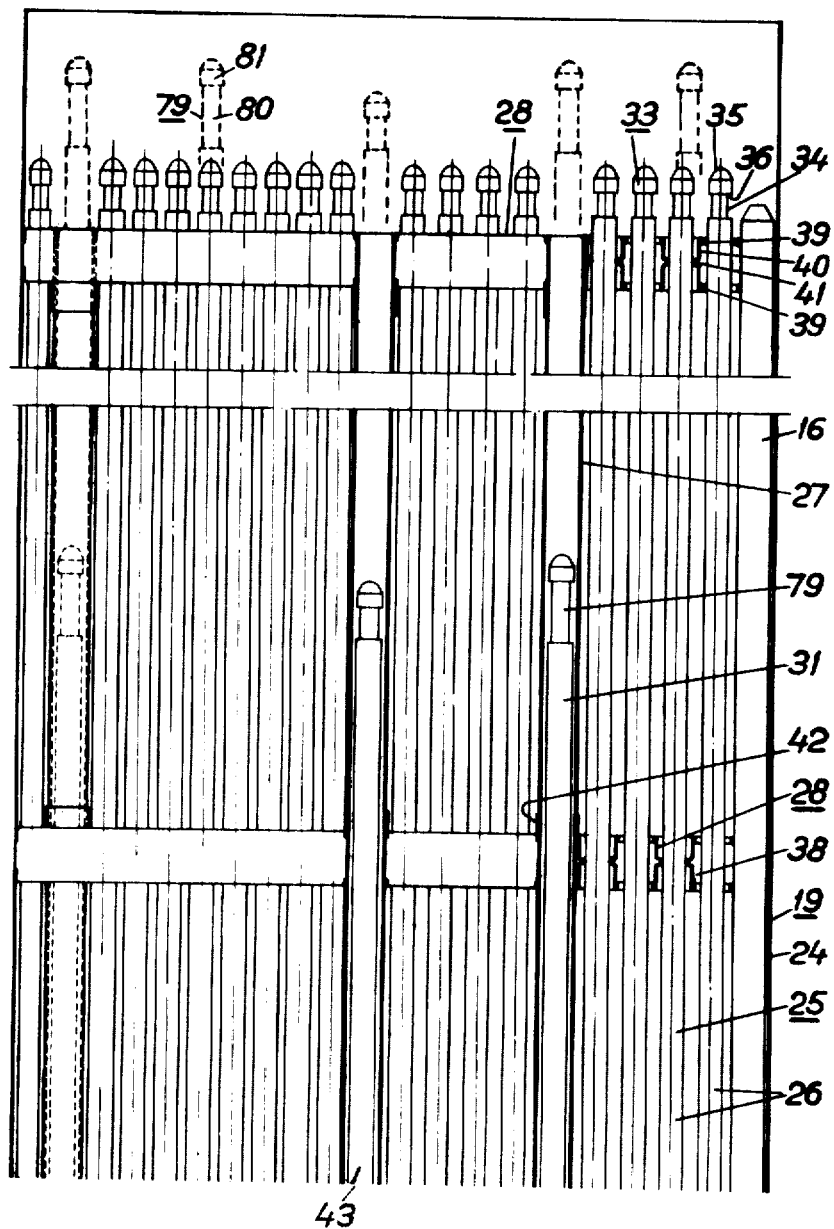
Figure 5C:
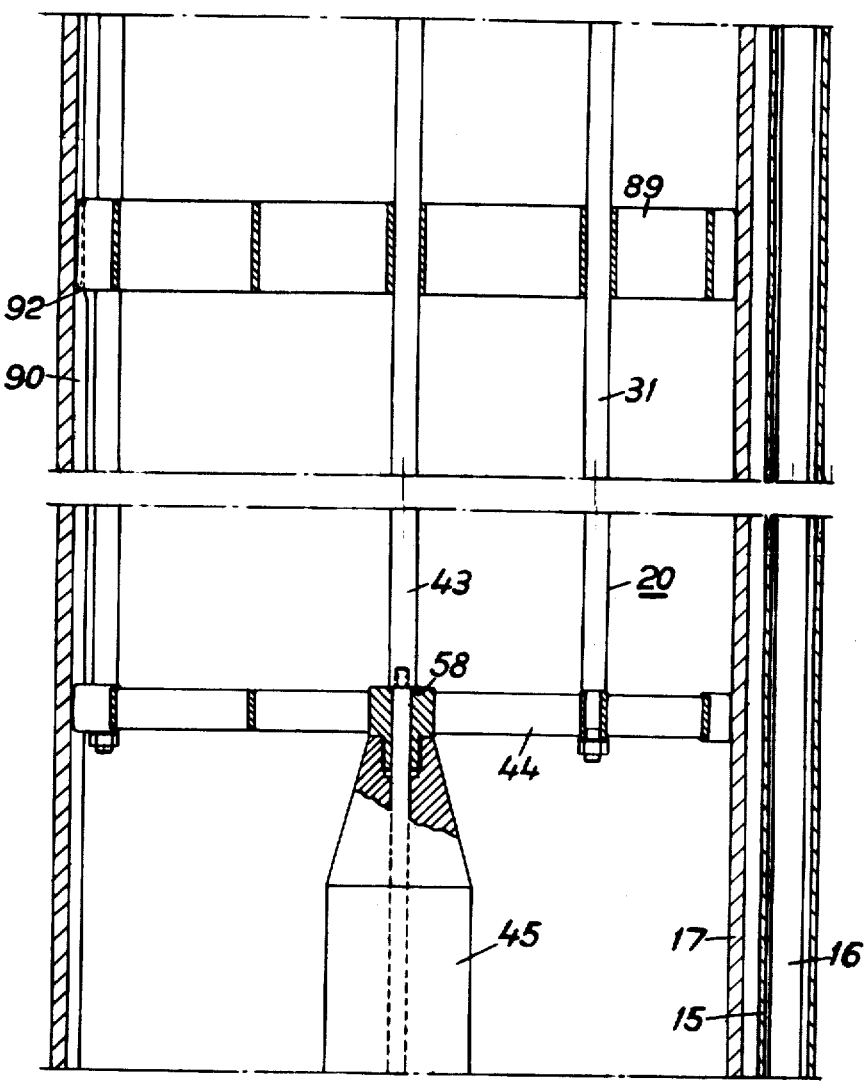

The lower ends of the absorber fingers 31 are screwed firmly into a finger holder 44 of frame-like structure. The finger holder 44 is shown in FIG. 5c. A central shaft 45 projects vertically downwards from the finger holder 44 and is provided at its lower end with a first coupling part 46 for coupling to a second coupling part 47 carried by a drive rod 48 belonging to the driving means 14 for the control rod. The control rod shaft is long so that the drive rod 48 will not be subjected to too much radiation.

Figure 5D:
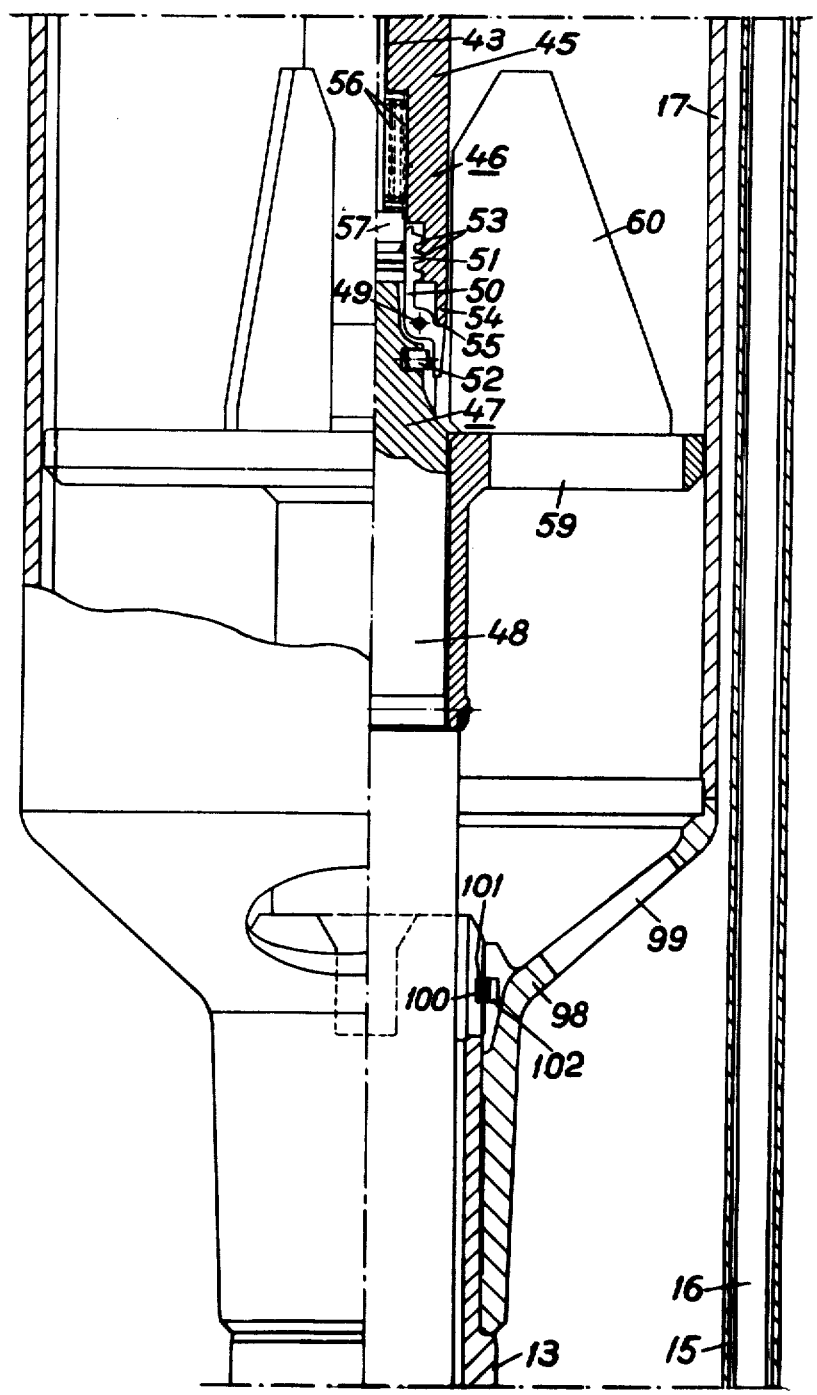
Figure 6:
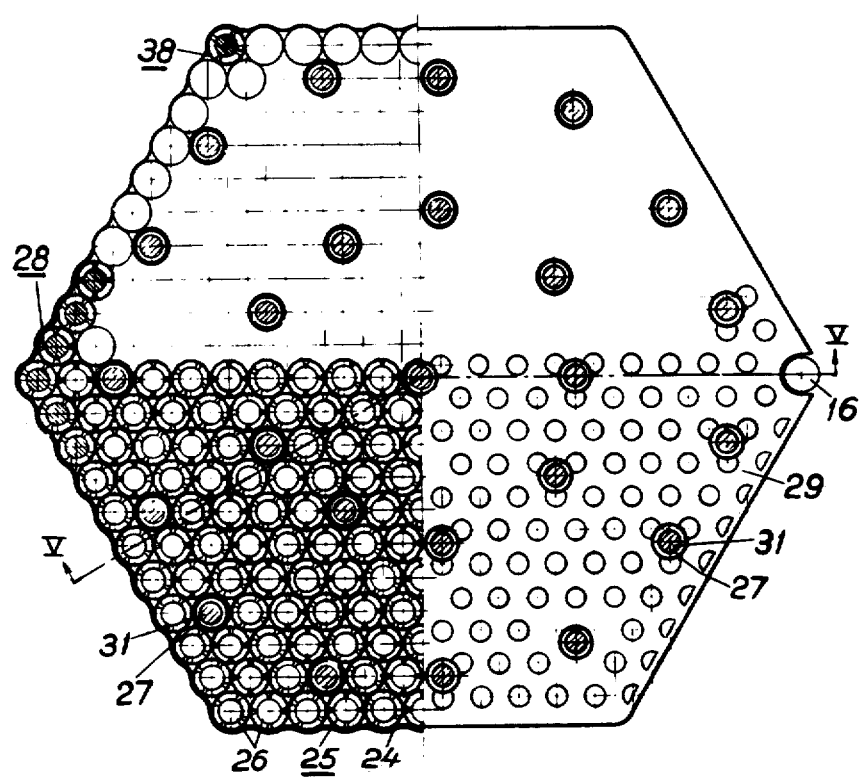
FIG. 6 shows a cross-section through the fuel assembly of the core unit along the line VI—VI in FIG. 5b.

FIG. 5d shows an embodiment in which the coupling part 47 carries radially movable coupling elements in the form of hooks 50 pivoted on horizontal shafts 49 and each having an upper toothed part 51. The hooks are spring-loaded (52) toward non-engaged position. The coupling part 46 is provided with counter-elements in the form of grooves 53 for engagement with the toothed parts 51 of the hooks 50. A tubular collar 54 projecting from the coupling part 46, upon insertion of the core unit towards the coupling part 47 when a core unit is being exchanged, will abut projections 55 arranged on the hooks 50, so that the hooks swing from non-engagement position to the engagement position shown in FIG. 5d with the toothed part 51 of the hook in engagement with the grooves 53. The central rod 43 is so long that its upper end projects axially from the upper end of the fuel rod bundle 25 when the control rod is completely inserted. A spring 56, which for safety reasons should be duplicated, presses the lower part of the central rod, which is shaped as a locking head 57, downwards to a locking position in which the hooks 50 cannot leave the engagement position. A stop 58 arranged on the central rod 43 normally rests against the finger holder 44 and prevents the rod 43 from moving further downwards. A coupling guide plate 59 provided with openings and arranged on the drive rod 48 guides the drive rod in the control rod guide tube 17 and carries axially extending plates 60 to guide the coupling part 46 towards the coupling part 47 when a core unit is being exchanged.

Lifting of the rod 43 will move head 57 out of the path of toothed parts 51, allowing locking members 50 to swing to releasing position.

Of course variations of the coupling in FIG. 5d can be used. For example, the pivoted hooks 50 may be attached to the coupling part 46, the grooves 53 in this case being formed in to the coupling part 47 and a central peg on the coupling part 47 replaces the tubular collar 54 projecting from the coupling part 46.

In yet another variation of the coupling the pivoted hooks 50 are replaced by balls which are movable in through-holes inclined inwards and downwards in the lower part of the coupling part 46, which is tubular. The upper part of the coupling 47 is similarly tubular and provided with an inner circular groove 53. The balls are prevented from leaving the hole at the bottom since the upward movement of the locking head 57 is limited by completely compressed spring 56 or a stop which, when the locking head is lifted, rests against the coupling part 46, and in outward direction by a ring set into the coupling part 46 and having a lip which limits the area of the hole. The end surface of the tubular part of the coupling part 46 is bevelled and acts partly as a guide surface when the coupling parts 46 and 47 are brought together and partly as a contact surface to the coupling part 47 to give the coupling parts substantially the correct position in relation to each other at the precise coupling moment.

The absorber fingers 31 shown in FIG. 5 are solid and consist of tubes with a filling of boron carbide. They are cooled by a flow of water in an annular gap between them and the surrounding guide tube 27 and the gap must therefore have a certain minimum width, for example 2 mm. The absorber fingers 31 are therefore so narrow that they may buckle. In order to reduce the tendency to buckle each absorber finger may be made tubular, the boron carbide in this case being arranged between concentric tubes and the space between the tubes being closed by hollow end plugs with tubular extensions. The tubular extension of the lower end plug is provided at the bottom with a thread for screwing into the finger holder 44. A large amount of coolant can now be led inside the absorber fingers 31 which may have a straight outlet or, for example, at least two side outlets. The cooling gap to the surrounding guide tubes 27 can thus be decreased which in turn means that the diameter of the absorber fingers can be increased and the absorber finger will be more resistant to buckling. Other designs for the absorber fingers 31 and other absorber material than boron carbide are also feasible.

The central rod 43 and each absorber finger 31 has an upper end part 79 with a neck part 80 and a head part 81 having a downwardly facing shoulder 82. The central rod 43 and the absorber fingers 31 are of such length that, when the control rod 20 is completely inserted, the end parts 79 project from the upper end of the fuel rod bundle 25. The shoulder 82 on the central rod 43 provides a grip for the lifting tool to disengage the coupling, and the shoulders 82 on the absorber fingers 31 provide a grip for the lifting tool 67 to lift the entire core unit 18. It is suitable if the shoulder 82 on the upper end part 79 of the central rod 43 is arranged at one level and the shoulders 82 on the upper end parts 79 of the absorber fingers 31 at another, higher level and if the distance between the levels is greater than the distance which the central rod 43 must be lifted to disengage the coupling, but less than the distance available for lifting said central rod between its lower locking position and an upper end position. This makes possible the use of a simply constructed tool for lifting the core unit, which tool may have all its gripping members arranged in one plane. When, after inserting the lifting tool 67, a lifting process is started, first only the central rod 43 is raised, but when its shoulder 82 is on a level with the shoulders 82 of the absorber fingers 31 the tool 67 lifts the core unit in all the end parts 79.

It is obvious that many different types of end parts can offer gripping possibilities. In order to ensure when lifting the core unit 18 that the load is evenly distributed over the absorber fingers 31, the shoulder 82 may be resilient upwards with respect to the absorber part of the finger 31, for example if the end part 79 comprises a tubular collar with a flange projecting inwardly at the top and a spring arranged between the flange and piston-like foot part arranged at the bottom of the neck part 80.

As mentioned above, the absorber fingers 31 are so slim in relation to their length that they risk being buckled if the fingertype control rod 20 is inserted rapidly. In order to be sufficiently strong the absorber fingers 31 may in certain cases need to have such diameter that they would not fit into a fuel rod position. By arranging at least one axially movable guide member, for example a guide plate 89, in the control rod guide tube 17, however, the diameter of the absorber fingers 31 may be selected substantially arbitrarily without there being a risk of buckling. The movable guide member 89 shown in FIG. 5c comprises a guide plate of frame structure and is similar to the finger holder 44, but may have a smaller number of cross bars than this and greater height. The movable guide plate 89, like the attachment plate 44 and the coupling guide plate 59 on the drive rod 48, is guided by means of three guide rods 90 running inside the control rod guide tube 17, and their extensions 91 on the inside of the lower circular elongate end part 22 of the fuel assembly 19. If a single movable guide plate 89 is necessary, this is positioned in a lower end position at about half the stroke length of the control rod below the fuel assembly 19, and if several movable guide plates are required, they are distributed to ensure maximum buckling-safety. When one movable guide plate 89 is used, this rests on the finger holder 44 and follows its movements if the control rod 20 is inserted more than half the stroke length. Under other conditions the movable guide plate 89 is held in its lower end position by its own weight. To ensure that the movable guide plate 89 returns to its lower end position, the central rod 43 or the absorber fingers, or both, may be provided with stops or the like which catch into the guide plate 89 and pull it down. The lifting force caused by a pressure drop in the coolant flowing up through the control rod guide tube is considerably less than the weight of the guide plate 89 if this has a suitable construction. In FIG. 5c the movable guide plate 89 rests in its lower end position on stops 92 on the guide rods 90, but it is clear that such stops can be arranged directly on the inner wall of the control rod guide tube 17. The movable guide plate 89 may also rest on legs extending downward to the lower part of the control rod guide tube 17 or be suspended on guide rods from the fuel assembly. Of course, with all these arrangements, the finger holder 44 must still be movable along the entire stroke length. In order to decrease the impact when the finger holder 44 during rapid insertion hits the movable guide plate 89 at full speed, the finger holder 44 and the movable guide plate 89 may be provided with cooperating members which together form a hydraulic shock absorber. Springs may also be used for this purpose.

The control rod guide tube 17 has a lower transition part 98 for connection to the control drive tubes 13. The transition part 98 is provided with inlet holes 99 for the coolant to be supplied to the fuel assembly. A slotted tension ring 100 is arranged in two opposite slots 101 and 102 in the control drive guide tube 13 and the transition part 98, respectively, in order to achieve a remote-controlled detachable connection between these components (13 and 98). The slot 101 has a depth corresponding to half the width of the tension ring and the slot 102 is twice as deep. When the core unit has been lifted out and the coupling guide plate 59 of the drive rod 48 has been dismounted, the tension ring 100 can be pressed into the slot 102 by means of a remote-controlled tool so that the control rod guide tube 17 is disengaged from the control drive guide tube 13.

The neutron flux measuring probes 16 are so elongate and so slim that they fit into any fuel rod position in the lattice and they are arranged in corner positions in the fuel assemblies 19 in such a way that all probes 16 have the same orientation with respect to respective fuel assemblies 19 so that the probes are distributed evenly over the core 1. The probe 16 leaves the fuel assembly 19 through the lower end of the shroud 24 and then runs parallel with the control rod guide tube 17 inside the leading-in tube 15 which in this case guides the probe 16. The probe then leaves the reactor pressure vessel 8 through its bottom part 9. The probes 16 are axially movable. When a core unit 18 is to be exchanged, the probe 16 is first drawn downwards out of the fuel assembly 19, after which the exchange can be carried out. The probe is then moved upwards again to its place in the new fuel assembly 19.

Figure 7:
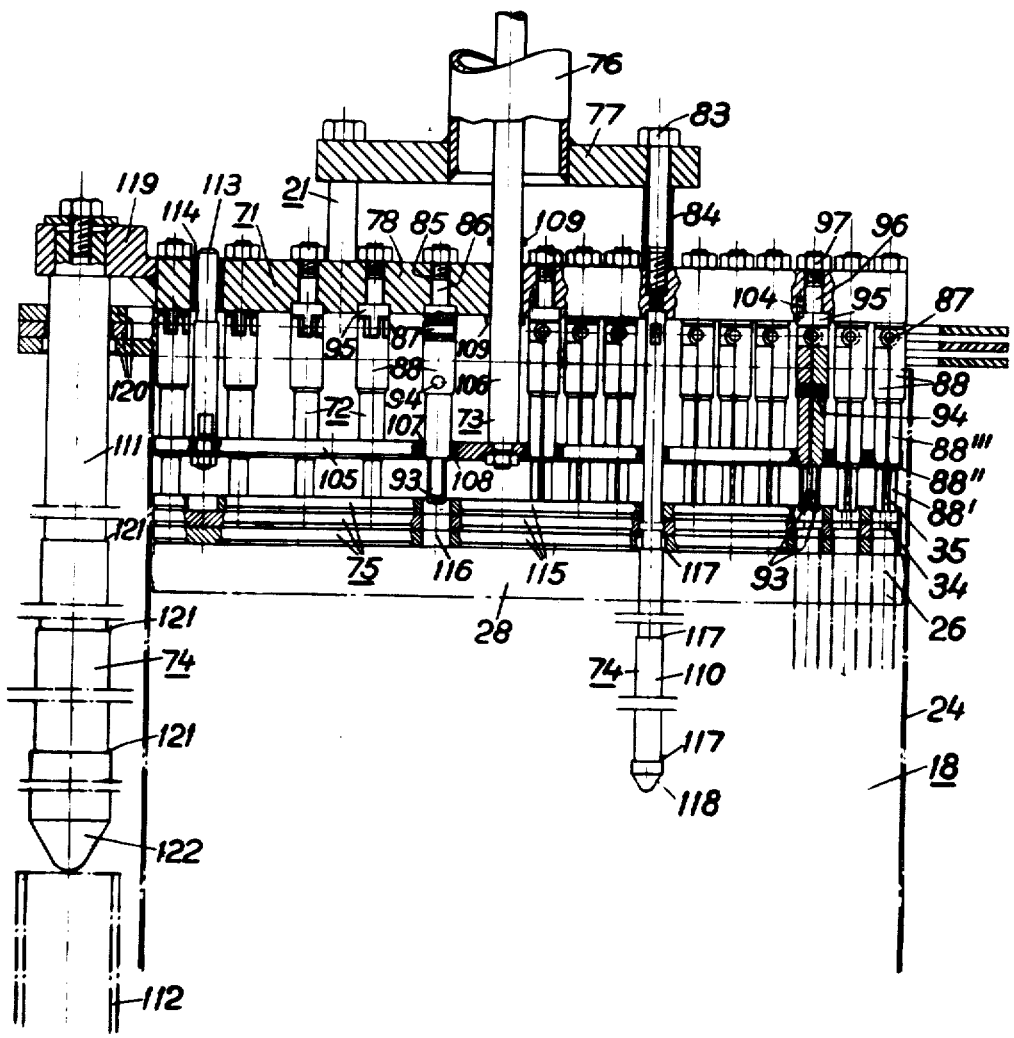
FIG. 7 shows schematically a partial longitudinal section through the tool according to the invention.
Figure 8:
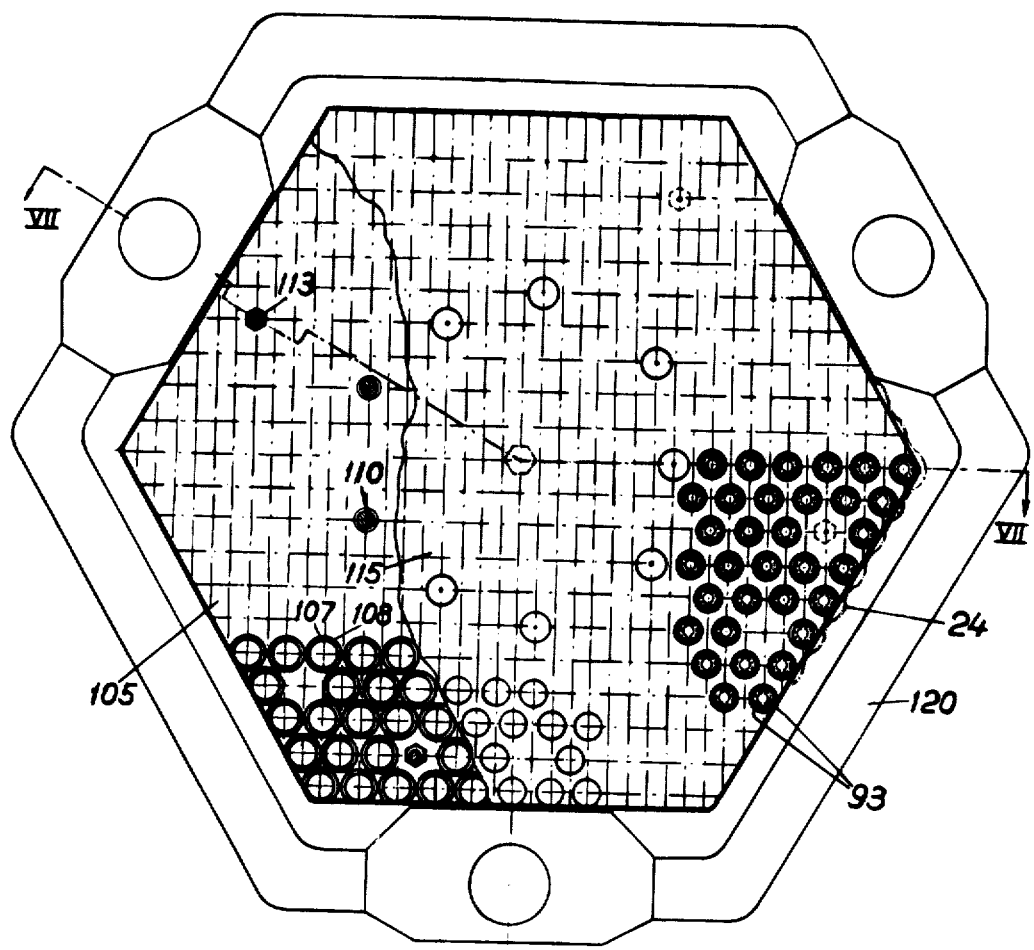
FIG. 8 shows schematically a cross-section through the tool.

The tool 21, shown in more detail in FIGS. 7 and 8, comprises the following main parts: a transverse carrier member 71, a multitude of gripping members 72, a transverse locking member 73 for the gripping members, guide means 74 for guiding the tool towards the core unit 18 and buckling-preventing members 75 to prevent the fuel rods from buckling during the insertion process.

The carrier member 71 comprises a tubular shaft 76 with a flange 77 which is attached to a hexagonal carrier plate 78 by means of screws 83 and is spaced from the carrier plate 78 by the screws 83 surrounded by spacer casings 84. The carrier plate 78 is provided with three hundred and five apertures 85 arranged in a lattice exactly corresponding to the actual lattice of fuel rods, the apertures 85 providing connection points for the gripping members 72. The flange 77 is screwed to the carrier plate 78 at at least three of the nine lattice positions corresponding to the inner ring of the guide tubes 27 for the absorber fingers 31, but it is also possible for the screw attachment to be located in positions corresponding to the outer guide tube ring or to be laterally outside the fuel assembly 19.

Each gripping member 72 comprises a connection part 86 for detachable connection to the carrier plate 78, a pivot 87 arranged in a plane perpendicular to the fuel rods 26, two gripping arms suspended suspend at the end nearest the carrier plate 78 from the pivot 87 and each provided at the other end with a gripping jaw 93 and a spring 94 being arranged to part the gripping jaws 93. The connection part 86 comprises a head 95 to which the pivot 87 is attached and a peg 96 projecting from the head, the free end of which is threaded. The peg 96 fits into all apertures 85 and is screwed to the carrier plate 78 with a nut 97. A locking pin 104 prevents the connection part 86 from rotating. The gripping arms 88 are identical and together with substantially circular cross-section. They also have a narrower part 88' at the bottom which, over a truncated conical transition part 88'', passes into a wider part 88'''.

The locking member 73 comprises a locking plate 105 and a central opening rod 106 leading from this plate which passes up through the carrier plate 78 and the tubular shaft 76. The locking plate 105 is provided with three hundred and five apertures 107 arranged in a lattice corresponding exactly to the actual fuel rod lattice, and additional apertures for slim rods 110 included in the guide means 74. The apertures 107 are provided with wear rings 108 of hard material, for example stellite, and the inner diameter of the wear rings is negligibly greater than the diameter of the widest part 88''' of the gripping arms. The locking plate 105 is axially movable between an upper position in which the wear rings 108 press the gripping jaws together against the spring force to grip round the neck part 34 of the fuel rods, and a lower position in which the springs 94 part the gripping jaws 93 so that the heads 35 of the fuel rods can pass between them. The axial movement of the locking member 73 is limited to stops, for example in the form of two pins 109 passing transversely through the operating rod 106 and situated one on each side of the carrier plate 78.

The locking plate 105 is provided with guide members in the form of at least three short rods 113 which are screwed into the locking plate 105 at positions corresponding to the absorber finger guide tubes 27 in the outer circle. The short rods 113 slide in apertures in the carrier plate 78, being guided by wear bushings 114 of hard material, for example stellite, arranged in the apertures.

The guide means 74 comprise at least three, preferably nine, slim rods 110 and at least three thick rods 111. The rods 110 are screwed into the carrier plate 78 in positions corresponding to the inner circle of ab-sorber finger guide tubes 27 and the rods 111 are screwed to the plate 78 through ears 119 welded on to the plate. During a refuelling operation the slim rods 110 slide in the absorber finger guide tubes 27 guided by the inner surfaces of the tubes, and the thick rods 111 slide in other guide tubes 112 outside the core units, the tubes 112 pertaining to the fuel exchange positions 69 and the deposit positions 70 (see FIGS. 1, 2 and 3).

When new fuel rods are inserted into the fuel assembly 19 during a refuelling operation, they mut be protected from buckling since the friction in the spacers 28 is relatively high. This is done with the help of the buckling-preventing members 75 in the form of three axially movable transverse plates 115 which are guided by the slim rods 110 and provided with apertures 116 for each fuel rod. At the start of the insertion process the plates 115 are distributed along the fuel rods 26 so that minimum buckling lengths are obtained. The plates 115 thus rest on parts projecting radially from the slim rods 110, in the embodiment according to FIG. 7 in the form of stops 117. The portions of the rods 110 between each pair of steps have constant diameter, successive portions being thicker at bottom and slimmer at the top. The rods have rounded tips 118 so that they can be more easily guided into the guide tubes 27. The radially projecting parts may also consist of small projections which do not prevent the rods 110 from being inserted in the guide tubes 27. The projections may be turned, for example 60°, in relation to each other between different levels and the apertures in the buckling-preventing plates 115 be provided with corresponding recesses so that, for example, the lower plate 115 can pass all the projections except the lowest, etc. Another suitable method of giving the plates 115 the desired mobility is to permit each of them to be suspended from at least three rods from the carrier plate 78. These rods are then attached to the plates 115 in positions corresponding to the outer circle of absorber finger guide tubes 27 and the rods are displaceable in apertures through the carrier plate 78. The free ends of the rods are provided with some sort of projection, for example a head. By a suitable choice of rod length for each plate 115 they will be suspended, at the start of the insertion process, from the upper side of the carrier plate spaced along the fuel rods 26 in such a way that minimum buckling lengths are obtained. As the tool 21 is lowered the plates 115 will come to rest on the uppermost spacer 28 of the fuel assembly 19. At least at the start of the lowering stage each plate 115 is surrounded radially by a movable guide frame 120 which is guided by the thick rods 111. These thick rods 111 are provided with radially projecting parts 121 similar to those on the slim rods 110. During the lowering process the support frames 120 will be caught by the upper edge of the core unit 18 and rest against this. A rounded tip 122 facilitates guiding the rods 111 into the tubes 112.

Modifications of the tool 21 described, within the scope of the claims are obvious to one skilled in the art. For example, the pivot 87 and the spring 94 may be omitted if the lower parts of the gripping arms 88 are yieldingly joined to the connection part 86. In this case also more than two gripping arms may be used. The connection between the gripping members and the carrier plate may be performed in several other obvious ways. Also the adjustment of the tool described to fit different fuel rod ends than those shown, for example those described in connection with the description of the fuel rods, is within the bounds of obviousness for an expert.

As is clear from FIG. 2, the fuel pool 7 is divided into two parts of equal size, separated from each other by a gate 123. In one corner, the upper lefthand corner in FIG. 2, there are three fuel exchange positions 69 and the depth of the pool is greater here than in the other parts of the pool. In this part part of the pool 7 there are also 154 deposit positions 70, 28 absorber finger positions 124 and a space 125 for diverse active equipment. The other part of the pool 7 holds two groups of deposit positions 70, one, 126 containing 48 and the other, 127, containing 108, a space 123 for small reactor components and a space 129 for a transport cask. Since the number of core units in the reactor 3 is 151, the number of deposit positions 70 is adequate.

The fuel exchange machine 14 can travel along one long side of the first part of the fuel pool 7 and reaches there twelve deposit positions 70 as well as the three fuel exchange positions 69. New fuel rods are moved to these twelve deposit positions and spent fuel rods from them in special transport stands with the help of the trolley 63 and the manipulating tool 67. These transport stands have principally the appearance of simplified fuel assemblies, since they enable new fuel rods to be arranged in the pattern determined for the fuel exchange taking place, but they can also be gripped by the manipulating tool 67 to be moved. Since the trolley 63 with the manipulating tool 67 and the fuel exchange machine 14 with the fuel exchange tool 121 operate independently of each other, there is no great alteration in the time required for refuelling in comparison with a conventional fuel exchange, although in the method according to the invention all the fuel assemblies in the core are taken out for partial refuelling. This admirable result is of course partly due to the core units being considerably larger than conventional fuel assemblies and thus considerably fewer in number.

The fuel exchange machine 14, which has two motors, one (130) for travelling and one (131) for vertical movement of the tool 21, is guided at the top and the bottom by pairs of wheels 132 running on rails 133. The exchange tool 21 is guided during its vertical displacement by two support legs 134. The motor 131 drives a long screw 135 running in a nut arranged on the tool 21. For lifting and lowering of the locking plate 105 there is an operating mechanism having a long rod 136 and a transverse arm 137 which is attached to the operating rod 106.

Each fuel exchange position 69 comprises sholder in which the core unit 18 is placed. The holder has guide tubes 112 for the thick rods 111 of the tool 21. At the upper edge of theholder are pneumatically operated locking hooks 138 to lock the core unit 18. Furthermore, at every fuel exchange position 69 is a device 139 to lower the fingertype control rod 20 to a normal lower position after lowering of a core unit 18 and to raise it again when the fuel rod exchange is complete so that the manipulating tool 67 can lift the core unit in the upper part of the fingers of the fingertype control rod 20 and transport the core unit 18 back to the reactor 3.

The fuel exchange position situated furthest into the corner of the fuel exchange pool is specially designed to enable exchange of a finger-type control rod. In this position there is a control rod exchange machine 140 which can travel a short distance perpendicularly to the direction of travel of the fuel exchange machine 14. The control rod exchange machine 140 is guided at the top and at the bottom by pairs of wheels 141 running on rails 142. It also has a motor 143 for travelling and a means 144 to lower the fingertype control rod 20 so that it leaves the fuel assembly 19 entirely. A pneumatically operated locking ring 145 can then be lowered to release a lower part of the holder of the fuel exchange position from an upper part. After displacement of the control rod exchange machine 140 laterally, the fingertype control rod 20 being carried with it standing in the lower part of the holder, the manipulating tool 67 can grip the control rod, transport it to one of the deposit positions 124 for control rods and replace it by a new one. The control rod exchange machine 140 returns, the locking ring 145 is raised and the new fingertype control rod 20 can be pushed up into the fuel assembly 19.

If a shroud 24 in a core unit 18 must be exchanged, the method is in principle the same as that for exchanging fuel rods. However, in this case the fuel rods which are not to be exchanged are extracted to be used again. The manipulating tool 67 transports away the used core unit with the spent fuel rods to a depositing position and a new core unit is collected. This is complete with the exception of those fuel rods from the old core unit which are to be used again. After insertion of these fuel rods the shroud exchange is complete.

Figure 9A:
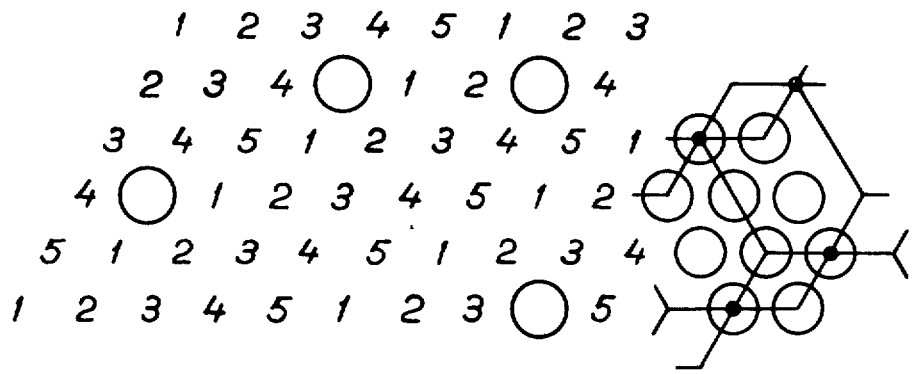
FIGS. 9a – c show schematically how the fuel rods in one corner of a fuel assembly which are to be exchanged upon every given occasion form a lattice-like, substantially regular pattern.
Figure 9B:
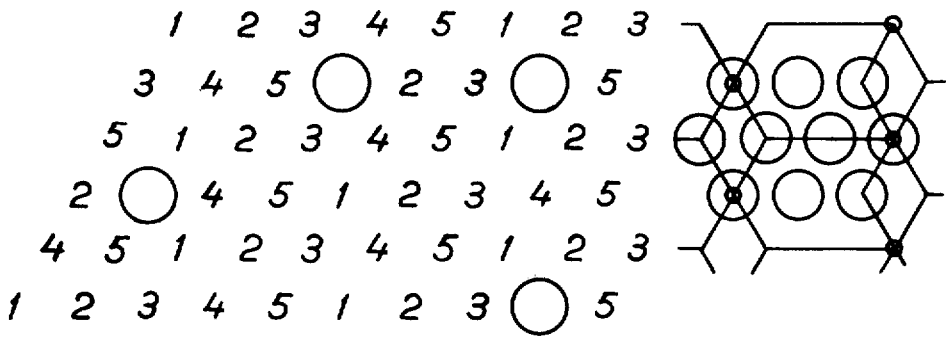
Figure 9C:
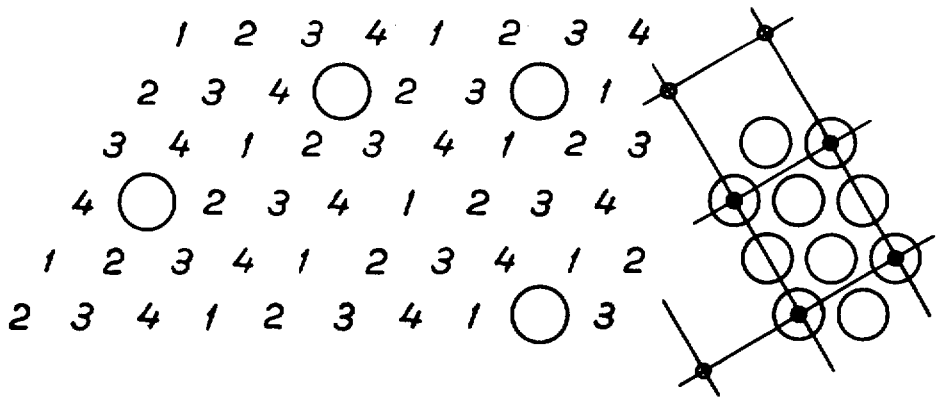

Examples of exchange patterns for refuelling are shown in FIGS. 9a, b and c. In these figures the fuel rods to be exchanged on the first occasion are designated 1 and those to be exchanged upon the next occasion 2, and so on. The circles in the rod lattice designate the guide tubes 27 for the absorber fingers. Upon comparison between the righthand parts of FIGS. 9a and b it is seen that only the orientation is different in these exchange patterns. These two figures apply when exchanging about one fifth of the number of fuel rods upon each refuelling occasion. FIG. 9c shows a pattern for exchanging about a quarter of the number of rods each time.

We claim:
1. In a device for refuelling a nuclear reactor having a core comprising a plurality of fuel assemblies, each of which comprises a multitude of parallel fuel rods arranged in a predetermined lattice, all the fuel rods being freely extractable and insertable at one end of the fuel assembly, a tool for extracting and inserting a number of the freely extractable and insertable fuel rods, comprising:
   a tool body;
   a number of gripping members attached to the tool body in positions corresponding to the lattice positions of the fuel rods to be extracted; means for urging the gripping members to grip and to release the fuel rods;
   the tool body comprising:
   a transverse and with respect to the fuel rods axially movable carrier member having a multitude of connection points for the gripping members, the connection points being arranged in a predetermined lattice identical to the fuel rod lattice; and
   guide means attached to the transverse carrier member for guiding the gripping members at least substantially coaxially with the respective fuel rods;

the tool having a multitude of said gripping members, of which a number corresponding to the number of fuel rods to be extracted at a given occasion are removably attached to the transverse carrier member at the connection points;

each gripping member comprising at least two cooperating gripping jaw members movable into and out of engagement with a shoulder facing the fuel rod at least partially;

the grip and release urging means comprising means for moving the gripping jaw members into engagement with the shoulder and means for moving the gripping jaw members out of engagement with the shoulder, whereby the tool can extract and insert an arbitrary number of fuel rods arranged in arbitrary fuel rod positions in the fuel rod lattice of the assembly;

the guide means comprising:

a plurality of guide rods rigidly attached to the transverse carrier member, each guide rod sliding in a tube parallel with the fuel rods guided by the inner surface of the tube during a fuel rod manipulation operation.

2. The tool of claim 1, in which:

some of the guide rods are arranged to slide in guide tubes for absorber fingers of a fingertype control rod, the absorber finger guide tubes being placed on fuel rod positions in the fuel rod lattice.

3. The tool of claim 2, in which the transverse carrier member comprises:

a transverse carrier plate; and a tubular, axial shaft having a transverse flange, attached to the transverse carrier plate at at least three of the lattice positions corresponding to guide tubes for the absorber fingers.

4. The tool of claim 3, in which the connection points are apertures in the carrier plate.

5. The tool of claim 2, in which each gripping member comprises:

a coupling part for detachable coupling to the transverse carrier member;

a pivot in the coupling part located in a plane perpendicular to the fuel rods; and two gripping arms, each arm suspended at one end on the pivot and having at the other end a gripping jaw.

6. The tool of claim 5, in which:

the gripping arms are identical, have together substantially circular cross-section, have a narrow part and a wide part and a truncated conical transition part between said parts;

the means for moving the gripping jaw members out of engagement comprising:

a spring element arranged to part the gripping jaws;

the means for moving the gripping jaw members into engagement comprising:

an axially displaceable transverse locking member having an axial aperture in each lattice position, the apertures located in the fuel rod positions cooperating with the gripping arms so that an axial displacement of the locking member from the narrow part of the gripping arms to the wide part moves together the gripping jaws against the spring force exerted by the spring elements.

7. The tool of claim 6, in which the transverse locking member comprises a transverse locking plate;

an operating rod projecting centrally and axially from the locking plate and through the transverse carrier member; and stops limiting the axial movement of the locking plate with respect to the gripping members.

8. The tool of claim 7, in which the locking member further comprises:

a plurality of axial guide rods attached to the locking plate in absorber finger guide tube positions;

the guide rods being slidingly guided by the walls of apertures arranged in the transverse carrier member.

9. The tool of claim 2, further comprising:

at least one axially movable member for preventing the fuel rods from buckling when being inserted into their respective positions in the fuel rod lattice.

10. The tool of claim 9, in which the buckling-preventing member comprises:

an axially movable transverse plate having an axial aperture for each fuel rod, the plate being guided by the guide rods projecting from the transverse carrier member and sliding in the absorber finger guide tubes.

11. The tool of claim 10, in which the guide rods have radially projecting stops;

the buckling-preventing plate during the first part of an insertion operation resting on the radially projecting stops and during the last part of the insertion operation resting at least indirectly against the fuel assembly.

12. The tool of claim 10, in which the buckling-preventing member further comprises:

at least three suspension guide rods attached to the buckling-preventing plate in lattice positions corresponding to those of the absorber finger guide tubes, the suspension guide rods extending axially through and being slidingly guided by apertures in the transverse carrier member and having free ends with radially projecting stops;

the buckling-preventing plate during the first part of an insertion operation resting suspended from the transverse carrier member by the suspension guide rods and their stops, and the plate during the last part of an insertion operation resting at least indirectly against the fuel assembly.

13. The tool of claim 10, further comprising:

means for supporting the buckling-preventing plate axially, at least during the first part of the insertion operation, at such a distance along the fuel rods to be inserted into the assembly, that minimum buckling lengths are obtained on both sides of the buckling-preventing plate.

14. The tool of claim 10, further comprising:

an axially movable support frame surrounding the buckling-preventing member radially, at least during the first part of the insertion operation; and axial guide rods attached to the transverse carrier member and arranged outside the fuel assembly for guiding the movable support frame.

* * * * *